US012194605B2

(12) United States Patent
Wang

(10) Patent No.: US 12,194,605 B2
(45) Date of Patent: Jan. 14, 2025

(54) CLAMP

(71) Applicants: Hangzhou United Tools Co., Ltd., Hangzhou (CN); Hangzhou Great Star Industrial Co., Ltd., Hangzhou (CN)

(72) Inventor: Wei Wang, Hangzhou (CN)

(73) Assignees: Hangzhou United Tools Co., Ltd., Hangzhou (CN); Hangzhou Great Star Industrial Co., Ltd., Hangzhou (CN)

( * ) Notice: Subject to any disclaimer, the term of this patent is extended or adjusted under 35 U.S.C. 154(b) by 268 days.

(21) Appl. No.: 17/771,553

(22) PCT Filed: Oct. 25, 2019

(86) PCT No.: PCT/CN2019/113217
§ 371 (c)(1),
(2) Date: Apr. 25, 2022

(87) PCT Pub. No.: WO2021/077385
PCT Pub. Date: Apr. 29, 2021

(65) Prior Publication Data

US 2022/0388126 A1 Dec. 8, 2022

(51) Int. Cl.
*B25B 5/02* (2006.01)
*B25B 5/04* (2006.01)
*B25B 7/10* (2006.01)

(52) U.S. Cl.
CPC .................. *B25B 7/10* (2013.01); *B25B 5/02* (2013.01); *B25B 5/04* (2013.01)

(58) Field of Classification Search
CPC .... B25B 7/14; B25B 7/12; B25B 7/10; B25B 27/14
See application file for complete search history.

(56) References Cited

U.S. PATENT DOCUMENTS 4,271,732 A 6/1981 Vaughan, Jr.
5,134,908 A 8/1992 Fisher
5,233,893 A 8/1993 Schmidt
(Continued)

FOREIGN PATENT DOCUMENTS

CN 201009178 Y 1/2008
CN 203077167 U 7/2013
(Continued)

OTHER PUBLICATIONS

Patent Cooperation Treaty, International Search Report for International Application No. PCT/CN2019/113217 dated Jul. 15, 2020 (5 pages) and English Translation (3 pages).
(Continued)

*Primary Examiner* — Lee D Wilson
(74) *Attorney, Agent, or Firm* — FITCH, EVEN, TABIN & FLANNERY LLP

(57) ABSTRACT

A clamp includes a first clamp body and a second clamp body, which intersect and are fastened by a pivot mechanism, form a jaw opening at one end of a pivot mechanism, and have respective handles at the other end of the pivot mechanism. A stop mechanism is disposed on the first clamp body and an anti-pinch flange is disposed at a position, corresponding to the protruding stop mechanism, on the second clamp body to prevent the two handles of the first clamp body and the second clamp body from further closing.

4 Claims, 9 Drawing Sheets

(56) References Cited

U.S. PATENT DOCUMENTS

| | | | | |
|---|---|---|---|---|
| RE45,680 | E * | 9/2015 | Nouvel | B25B 7/10 |
| 2009/0193943 | A1 * | 8/2009 | Alexander | B25B 7/10<br>81/411 |
| 2015/0336243 | A1 | 11/2015 | Wang | |
| 2018/0021926 | A1 * | 1/2018 | Wang | B25B 7/10<br>81/409.5 |
| 2022/0152786 | A1 * | 5/2022 | Tsai | B25B 7/10 |
| 2022/0388126 | A1 * | 12/2022 | Wang | B25B 7/10 |

FOREIGN PATENT DOCUMENTS

| | | | |
|---|---|---|---|
| CN | 104015134 | A | 9/2014 |
| DE | 38 02 440 | A1 | 8/1989 |
| JP | H08-131007 | A | 5/1996 |
| WO | 2017/007341 | A1 | 1/2017 |

OTHER PUBLICATIONS

Patent Cooperation Treaty, Written Opinion of the International Searching Authority for International Application No. PCT/CN2019/113217 dated Jul. 15, 2020 (3 pages) and Machine English Translation (2 pages).

* cited by examiner

CLAMP

CROSS-REFERENCE TO RELATED APPLICATIONS

This application is a U.S. national phase application filed under 35 U.S.C. § 371 of International Application Number PCT/CN2019/113217, filed Oct. 25, 2019, designating the United States.

FIELD OF THE INVENTION

The present application relates to the field of manual tools, and in particular to a clamp.

DESCRIPTION OF THE PRIOR ART

A clamp is a portable and small manual tool that is widely used to hold or mount a simple object.

A conventional clamp has two intersecting clamp arms. The two clamp arms may rotate around a pivot at an intersection to hold an object. A jaw opening used to hold an object is formed above the intersection. Clamp handles for holding are formed below the intersection. However, a jaw opening of such a clamp has a fixed opening size and can hold objects within a limited range of size.

Therefore, a pipe clamp with an adjustable jaw opening size is disclosed in Chinese Patent CN 45077167 U. The pipe clamp comprises an upper handle and a lower handle. A front end of the lower handle is provided with upper teeth. A front end of the upper handle is provided with lower teeth. The lower handle crosses the upper handle. The two handles intersect to enable the upper teeth and the lower teeth to form a clamping opening. The lower handle is provided with a tooth groove. A toothed belt is disposed on an inner wall of the tooth groove. A tooth block is hinged on the upper handle. Teeth disposed on one side of the tooth block are connected to the toothed belt and move unidirectionally along the toothed belt. The other side of the tooth block abuts a spring. The spring abuts the lower handle. The upper handle is provided with a push piece hinged to the tooth block. During operation of the pipe clamp of the present application, the upper handle is pushed to slide along the tooth groove in a direction of tightening the teeth. In this case, the upper handle may smoothly slide upward. The upper and lower teeth can implement tight clamping. Because of the unidirectional movement, the tooth block cannot slide along the toothed belt by itself When the upper and lower teeth need to be released, the push piece is pushed. The push piece drives the tooth block to be detached from the toothed belt. In this way, the upper handle may slide down along the tooth groove so as to be detached from the teeth.

However, the handles are usually held by one hand and gripped between the palm near the thumb and other fingers. Therefore, if the clamping opening slides or is accidentally detached from a workpiece, the handles may rapidly close in an uncontrolled manner, which tends to injure the hand.

Therefore, a person skilled in the art strives to develop a clamp that can prevent a hand from being injured if a clamping opening slides or is accidentally detached from a workpiece.

SUMMARY OF THE INVENTION

In view of the foregoing disadvantages in the prior art, the technical problem to be resolved by the present application is that a hand is easily injured if a clamping opening slides or is accidentally detached from a workpiece.

To achieve the foregoing objective, the present application provides a clamp, comprising a first clamp body and a second clamp body, wherein the first clamp body and the second clamp body intersect and are fastened by a pivot mechanism, the first clamp body and the second clamp body form a jaw opening at one end of the pivot mechanism and form respective handles at the other end of the pivot mechanism, and the first clamp body and the second clamp body rotate with respect to each other around the pivot mechanism to implement holding of the jaw opening, wherein the first clamp body and/or the second clamp body is provided with a stop mechanism to enable the handle of the first clamp body and the handle of the second clamp body to be stopped by the stop mechanism when the handles are closed, so that a gap exists between the handle of the first clamp body and the handle of the second clamp body.

Optionally, the stop mechanism of the first clamp body is a first protruding stop mechanism, and the stop mechanism of the second clamp body is a second protruding stop mechanism;

- the first protruding stop mechanism is located at a position, facing the second clamp body, between the jaw opening and an outermost end of the handle of the first clamp body, on the first clamp body; and/or the second protruding stop mechanism is located at a position, facing the first clamp body, between the jaw opening and an outermost end of the handle of the second clamp body, on the second clamp body;
- the first protruding stop mechanism touches and is clamped on the opposite second clamp body during narrowing or closing of the jaw opening and/or the second protruding stop mechanism touches and is clamped on the opposite first clamp body during narrowing or closing of the jaw opening, to prevent the two handles of the first clamp body and the second clamp body from further closing.

Optionally, the first clamp body comprises a first handle, a first clamp jaw, and a first shank portion connecting the first handle and the first clamp jaw; and the second clamp body comprises a second handle, a second clamp jaw, and a second shank portion connecting the second handle and the second clamp jaw;

- the first clamp jaw and the second clamp jaw form the jaw opening;
- optionally, the first protruding stop mechanism is located on a side surface of the first shank portion of the first clamp body and faces the second clamp body; and/or
- the second protruding stop mechanism is located on a side surface of the second shank portion of the second clamp body and faces the first clamp body.

Optionally, the first protruding stop mechanism is located on the first clamp jaw and near the first shank portion, and faces the second clamp body; or the first protruding stop mechanism is located on the first shank portion and near a side surface of the first handle, and faces the second clamp body; or the first protruding stop mechanism is located on a side surface at an intersection between the first shank portion and the first handle and faces the second clamp body; or the first protruding stop mechanism is located on the first shank portion and near a side surface of the first clamp jaw, and faces the second clamp body; or the first protruding stop mechanism is located on a side surface at an intersection between the first shank portion and the first clamp jaw and faces the second clamp body; or the first protruding stop mechanism is located on a side surface at a middle position of the first shank portion and faces the second clamp body; and/or the second protruding stop mechanism is located on the second clamp jaw and near the second shank portion, and faces the first clamp body; or the second protruding stop mechanism is located on the second shank portion and near a side surface of the second handle, and faces the first clamp body; or the second protruding stop mechanism is located on a side surface at an intersection between the second shank portion and the second handle and faces the first clamp body; or the second protruding stop mechanism is located on the second shank portion and near a side surface of the second clamp jaw, and faces the first clamp body; or the second protruding stop mechanism is located on a side surface at an intersection between the second shank portion and the second clamp jaw and faces the first clamp body; or the second protruding stop mechanism is located on a side surface at a middle position of the second shank portion and faces the first clamp body.

Optionally, the first clamp body comprises a first handle, a first clamp jaw, and a first shank portion connecting the first handle and the first clamp jaw; and the second clamp body comprises a second handle, a second clamp jaw, and a second shank portion connecting the second handle and the second clamp jaw;

the first clamp jaw and the second clamp jaw form the jaw opening;

the first protruding stop mechanism is located on a side surface of the first handle of the first clamp body and faces the second clamp body; and/or the second protruding stop mechanism is located on a side surface of the second handle of the second clamp body and faces the first clamp body.

Optionally, the first protruding stop mechanism is located on a side surface, near the first shank portion, of the first handle and faces the second clamp body; or the first protruding stop mechanism is located on a side surface at a middle position of the first handle and faces the second clamp body; or the first protruding stop mechanism is located on a side surface at an end position of the first handle and faces the second clamp body; and/or the second protruding stop mechanism is located on a side surface, near the second shank portion, of the second handle and faces the first clamp body; or the second protruding stop mechanism may be located on a side surface at a middle position of the second handle and face the first clamp body; or the second protruding stop mechanism is located on a side surface at an end position of the second handle and faces the first clamp body.

Optionally, the first protruding stop mechanism and/or the second protruding stop mechanism is a protruding cylinder, a protruding square column or a protruding column body with an irregular shape.

Optionally, the first clamp body comprises a first handle, a first clamp jaw, and a first shank portion connecting the first handle and the first clamp jaw; and the second clamp body comprises a second handle, a second clamp jaw, and a second shank portion connecting the second handle and the second clamp jaw;

the first clamp jaw and the second clamp jaw form the jaw opening;

the first protruding stop mechanism is a protruding stop edge that is located on a side surface, near the first shank portion, of the first handle and faces the second clamp body or is located on a side surface at an intersection between the first handle and the first shank portion and faces the second clamp body; and/or the second protruding stop mechanism is a protruding stop edge that is located on a side surface, near the second shank portion, of the second handle and faces the first clamp body or is located on a side surface at an intersection between the second handle and the second shank portion and faces the first clamp body.

Optionally, a first anti-pinch flange is disposed at a position, corresponding to the second protruding stop mechanism, on the first clamp body, to touch and be clamped on the second protruding stop mechanism during narrowing or closing of the jaw opening; and/or a second anti-pinch flange is disposed at a position, corresponding to the first protruding stop mechanism, on the second clamp body, to touch and be clamped on the first protruding stop mechanism during narrowing or closing of the jaw opening.

Optionally, the first anti-pinch flange and/or the second anti-pinch flange is made of an elastic material.

Optionally, the first protruding stop mechanism and/or the second protruding stop mechanism is made of an elastic material.

Optionally, the first clamp body comprises a first handle, a first clamp jaw, and a first shank portion connecting the first handle and the first clamp jaw; and the second clamp body comprises a second handle, a second clamp jaw, and a second shank portion connecting the second handle and the second clamp jaw;

the first clamp jaw and the second clamp jaw form the jaw opening;

the first shank portion of the first clamp body is provided with a hollow penetrating first long slot in a lengthwise direction of the first shank portion, and a tilt lower stop edge is provided on an inner side surface, near the first handle, of the first long slot;

the second clamp jaw of the second clamp body is disposed to pass through the first long slot of the first clamp body to intersect with the first clamp body, and the pivot mechanism relatively fastens the first clamp body and the second clamp body intersecting with each other; and when the first handle and the second handle move toward each other to approach or close, the tilt lower stop edge touches and is clamped on the second handle of the second clamp body or at an intersection between the second shank portion and the second handle or on the second shank portion, to prevent the first handle and the second handle from further closing.

Optionally, the second shank portion of the second clamp body is provided with a hollow penetrating second long slot in a lengthwise direction of the second shank portion;

a first through hole is provided at a position on the first shank portion of the first clamp body and near the first clamp jaw or at an intersection between the first clamp jaw and the first shank portion; and the second clamp jaw of the second clamp body is disposed to pass through the first long slot of the first clamp body to intersect with the first clamp body, and the pivot mechanism passes through the first through hole to pass through the second long slot of the second shank portion to relatively fasten the first clamp body and the second clamp body intersecting with each other.

Optionally, a tilt upper stop edge is provided on an inner side surface, near the first clamp jaw, of the first long slot; and when the first handle and the second handle move toward each other to approach or close, the tilt upper stop edge touches and is clamped on the second shank portion, to prevent the first handle and the second handle from further closing.

Optionally, a tilt angle of the tilt lower stop edge is 30°-80°.

Optionally, a tilt angle of the tilt upper stop edge is 30°-80°.

Optionally, an anti-pinch flange is provided at a position, corresponding to the tilt lower stop edge, on the second shank portion or the second handle of the second clamp body, and when the first handle and the second handle move toward each other to approach or close, the tilt lower stop edge touches and is clamped on the anti-pinch flange, to keep the first handle and the second handle from further closing.

Optionally, the first clamp body comprises a first handle, a first clamp jaw, and a first shank portion connecting the first handle and the first clamp jaw; and the second clamp body comprises a second handle, a second clamp jaw, and a second shank portion connecting the second handle and the second clamp jaw;

the first clamp jaw and the second clamp jaw form the jaw opening;

the first shank portion of the first clamp body is provided with a hollow penetrating first long slot in a lengthwise direction of the first shank portion;

the second clamp jaw of the second clamp body is disposed to pass through the first long slot of the first clamp body to intersect with the first clamp body, and the pivot mechanism relatively fastens the first clamp body and the second clamp body intersecting with each other;

a pin shaft transversely passing through the first long slot is disposed at a position, near the first handle, of the first long slot; and when the first handle and the second handle move toward each other to approach or close, the pin shaft touches and is clamped on the second handle of the second clamp body or at an intersection between the second shank portion and the second handle or on the second shank portion, to prevent the first handle and the second handle from further closing.

Optionally, the second shank portion of the second clamp body is provided with a hollow penetrating second long slot in a lengthwise direction of the second shank portion;

a first through hole is provided at a position on the first shank portion of the first clamp body and near the first clamp jaw or at an intersection between the first clamp jaw and the first shank portion; and the second clamp jaw of the second clamp body is disposed to pass through the first long slot of the first clamp body to intersect with the first clamp body, and the pivot mechanism passes through the first through hole to pass through the second long slot of the second shank portion to relatively fasten the first clamp body and the second clamp body intersecting with each other.

Optionally, the pin shaft and the first shank portion are integrally molded.

Optionally, two side surfaces with the first long slot 1523 of the first shank portion are respectively provided with one fastening hole, and the pin shaft passes through the first long slot to be fastened in the two fastening holes.

Optionally, a protruding anti-pinch flange is provided at a position, corresponding to the pin shaft, on the second shank portion or the second handle of the second clamp body, and when the first handle and the second handle move toward each other to approach or close, the pin shaft touches and is clamped on the anti-pinch flange, to keep the first handle and the second handle from further closing.

Optionally, the anti-pinch flange is made of an elastic material.

Optionally, the anti-pinch flange is located at a position on the second shank portion of the second clamp body and near the second handle, or is located at a position on the second handle and near the second shank portion, or is located at an intersection between the second shank portion and the second handle.

In the embodiments of the present application, a stop mechanism is added to a clamp body. When handles rapidly close because a clamping opening of the clamp body suddenly becomes loose or an object being held is accidentally damaged or detached, the stop mechanism prevents the handles of the clamp body from closing completely, to always keep a gap between the handles of the clamp body to prevent a hand from being injured by the handles.

The concept, specific structure, and resulting technical effect of the present application are further described below in conjunction with the drawings to fully understand the object, features and effects of the present application.

DETAILED DESCRIPTION OF THE PREFERRED EMBODIMENTS

Figure 1:
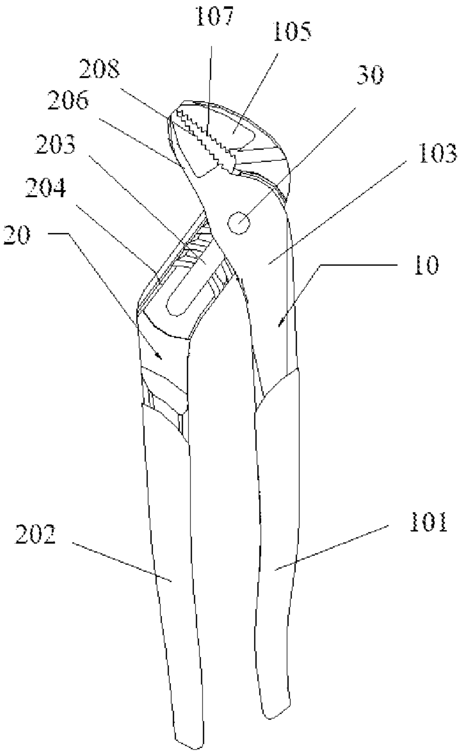
FIG. 1 is a schematic structural diagram of a clamp according to an embodiment of the present application.

Preferred embodiments of the present application are described below with reference to the drawings of the specification to make the technical contents clearer and easier to understand. The present application can be embodied in various forms of embodiments, and the scope of protection of the present application is not limited to the embodiments mentioned herein.

Unless otherwise defined, the technical and scientific terms used herein have the same meanings as how they are generally understood by those skilled in the art to which the present application pertains. The terms used in the specification of the present application herein are only used to describe specific embodiments rather than to limit the present application. The terms "comprise" and "have" used in the specification, claims, and the drawings of the present application or any variations of such terms are intended to cover a non-exclusive inclusion. It should be noted that the terms "first", "second" and the like in the specification and claims of the present application as well as the above-mentioned accompanying drawings are used to distinguish different objects and are not necessarily used to describe a specific order.

The phrase "embodiments" referred to herein means that the descriptions of specific features, structures, and characteristics in combination with the embodiments are comprised in at least one embodiment of the present application. The phrase at various locations in the specification does not necessarily refer to a same embodiment, or an independent or alternate embodiment exclusive of another embodiment. Persons skilled in the art understand, in explicit and implicit manners, that an embodiment described in this application may be combined with another embodiment.

The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In the drawings, the same reference numeral indicates components having the same structure, and similar reference numerals indicate assemblies having similar structures or functions throughout. The size and thickness of each assembly shown in the figures are shown arbitrarily, and the present application does not define the size and thickness of each assembly. In order to make the illustration clearer, the thickness of the component in some places of the figures is appropriately exaggerated.

A clamp is disclosed in embodiments of the present application. The clamp may be a water pump clamp, a pipe clamp or another clamp. Both clamp bodies may be disposed in a hook form, and teeth are provided on inner sides to facilitate holding and clamping. A clamp body and handles may be integrally molded or may be connected by using a connection measure.

As shown in FIG. 1, which is a schematic structural diagram of a clamp according to an embodiment of the present application. The clamp comprises a first clamp body 10 and a second clamp body 20. The first clamp body 10 and the second clamp body 20 intersect. For example, the first clamp body 10 and the second clamp body 20 are relatively fastened by a pivot mechanism 30. The first clamp body 10 and the second clamp body 20 form a jaw opening at one end of the pivot mechanism 30 and have respective handles at the other end of the pivot mechanism 30. The first clamp body 10 and the second clamp body 20 rotate with respect to each other around the pivot mechanism 30 to implement holding of the jaw opening.

The pivot mechanism 30 may be a pivot. For example, the pivot may be a pivot bolt or a pivot screw, wherein the pivot is a cylinder.

The first clamp body 10 comprises a first handle 101, a first clamp jaw 105, and a first shank portion 103 connecting the first handle 101 and the first clamp jaw 105. The second clamp body 20 comprises a second handle 202, a second clamp jaw 206, and a second shank portion 204 connecting the second handle 202 and the second clamp jaw 206.

The first clamp jaw 105 and the second clamp jaw 206 form a jaw opening. A bend exists at an intersection between the first clamp jaw 105 and the first shank portion 103 to form a hook form. A bend exists at an intersection between the second clamp jaw 206 and the second shank portion 204 to form a hook form. In another embodiment of the present application, the first clamp jaw 105 and the second clamp jaw 206 respectively have a first exposed surface 107 and a second exposed surface 208 that are positioned opposite. The first exposed surface 107 and the second exposed surface 208 have sawtooth to facilitate secure clamping of a workpiece.

The second shank portion 204 of the second clamp body 20 is provided with a hollow penetrating long slot 203 in a lengthwise direction of the second shank portion 204. The long slot 203 may be a strip-shaped groove or may be an approximately strip-shaped groove such as an elongated elliptical groove, and a toothed belt is provided on an inner side surface of the long slot 203.

A first through hole is provided at a position on the first clamp body 10 and near the first clamp jaw 105 or at an intersection between the first clamp jaw 105 and the first shank portion 103. The pivot mechanism 30 passes through the first through hole and then continues to pass through the long slot 203 of the second shank portion 204. The first clamp body 10 and the second clamp body 20 are relatively fastened. The first clamp body 10 and the pivot mechanism 30 are fastened. The second clamp body 20 rotates around the pivot mechanism 30. In this way, the first clamp body 10 and the second clamp body 20 can rotate with respect to each other around the pivot mechanism 30 to enable the jaw opening formed by the first clamp jaw 105 and the second clamp jaw 206 to open or close, and the first clamp body 10 and the second clamp body 20 can also move relative to each other in a lengthwise direction corresponding to the long slot 203, so that the jaw opening can be expanded or narrowed to be suitable for holding workpieces with different sizes.

In another embodiment of the present application, the pivot mechanism 30 has a smooth rotating surface. For example, a surface that is on the pivot mechanism 30 and is in contact with the long slot 203 is a smooth surface.

In another embodiment of the present application, a toothed belt that meshes with the toothed belt on the inner side surface of the long slot 203 is provided on a surface that is on the pivot mechanism 30 and is in contact with the long slot 203. In this way, when the toothed belt of the pivot mechanism 30 and the toothed belt of the long slot 203 mesh with each other, the pivot mechanism 30 and the second clamp body 20 are fastened, and the first clamp body 10 may relatively rotate around the pivot mechanism 30 to enable the jaw opening formed by the first clamp jaw 105 and the second clamp jaw 206 to open or close.

When the jaw opening needs to be expanded, the first clamp body 10 drives the pivot mechanism 30 to be detached from the toothed belt on the inner side surface of the long slot 203 of the second clamp body 20. The first clamp body 10 is then pulled downward from the top of the long slot 203. In this way, the jaw opening formed by the first clamp jaw 105 and the second clamp jaw 206 is expanded. In this way, when the jaw opening is pulled open, an object is placed in the jaw opening, and the jaw opening is then conveniently narrowed to hold the object adequately.

In another embodiment of the present application, the teeth on the toothed belt on the inner side surface of the long slot 203 and the teeth on the rotating surface of the pivot mechanism 30 are one-way ratchets that mesh with each other. That is, the teeth on the toothed belt on an inner side portion of the long slot 203 all obliquely face one direction. A direction in which the teeth on the rotating surface of the pivot mechanism 30 all obliquely face and the facing direction of the teeth on the toothed belt on the inner side surface of the long slot 203 are opposite. In this way, when a force is applied in an opposite direction of the direction in which the teeth on the inner side surface of the long slot 203 tilt, that is, there are inverted hooks between the teeth on the surface of the pivot mechanism 30 and the teeth on the inner side portion of the long slot 203, an external force is required to detach them such that the pivot mechanism 30 can slide in the long slot 203. In the direction in which the teeth on the inner side surface of the long slot 203 tilt, the pivot mechanism 30 may be automatically detached from the teeth on the toothed belt on the inner side portion of the long slot 203 without needing the intervention of an external force, so as to implement fast one-way slide.

In the clamp, a first protruding stop mechanism (not shown in the figure) may be disposed at any position, facing the second clamp body 20, between the pivot mechanism 30 and the outermost end of the handle of the first clamp body 10 on the first clamp body 10 and/or a second protruding stop mechanism (not shown in the figure) may be disposed at any position, facing the first clamp body 10, between the pivot mechanism 30 and the outermost end of the handle of the second clamp body 20 on the second clamp body 20. The first protruding stop mechanism touches and is clamped on the opposite second clamp body 20 during narrowing or closing of the jaw opening and/or the second protruding stop mechanism touches and is clamped on the opposite first clamp body 10 during narrowing or closing of the jaw opening, to prevent the first handle 101 of the first clamp body 10 and the second handle 202 of the second clamp body 20 from further closing. In this way, it can be restricted that the distance between the first handle 101 and the second handle 202 can still be greater than a particular threshold when they are prevented from closing, so that if the jaw opening suddenly slides off from a workpiece or suddenly becomes loose by accident or an object being held is accidentally damaged or detached, a user's hand gripping the first handle 101 and the second handle 202 is prevented from being injured.

For example, the first protruding stop mechanism is located on a side surface of the first shank portion 103 of the first clamp body 10 and faces the second clamp body 20 and/or the second protruding stop mechanism is located on a side surface of the second shank portion 204 of the second clamp body 20 and faces the first clamp body 10.

For example, the first protruding stop mechanism may be located on the first shank portion 103, be near the side surface of the first handle 101, and face the second clamp body 20, or the first protruding stop mechanism may be located on a side surface at an intersection between the first shank portion 103 and the first handle 101 and faces the second clamp body 20, or the first protruding stop mechanism may be located on the first shank portion 103, be near the side surface of the first clamp jaw 105 and face the second clamp body 20, or the first protruding stop mechanism may be located on a side surface at an intersection between the first shank portion 103 and the first clamp jaw 105 and face the second clamp body 20, or the first protruding stop mechanism may be located on a side surface at a middle position of the first shank portion 103 and face the second clamp body 20.

For example, the second protruding stop mechanism may be located on the second shank portion 204, be near the side surface of the second handle 202, and face the first clamp body 10, or the second protruding stop mechanism may be located on a side surface at an intersection between the second shank portion 204 and the second handle 202 and face the first clamp body 10, or the second protruding stop mechanism may be located on the second shank portion 204, be near the side surface of the second clamp jaw 206, and face the first clamp body 10, or the second protruding stop mechanism may be located on a side surface at an intersection between the second shank portion 204 and the second clamp jaw 206 and face the first clamp body 10, or the second protruding stop mechanism may be located on a side surface at a middle position of the second shank portion 204 and face the first clamp body 10.

In another embodiment of the present application, the first protruding stop mechanism may be located on the side surface of the first handle 101 of the first clamp body 10 and face the second clamp body 20 and/or the second protruding stop mechanism may be located on the side surface of the second handle 202 of the second clamp body 20 and face the first clamp body 10.

For example, the first protruding stop mechanism may be located on the first handle 101, be near the side surface of the first shank portion 103, and face the second clamp body 20, or the first protruding stop mechanism may be located on a side surface at a middle position of the first handle 101 and face the second clamp body 20, or the first protruding stop mechanism may be located on a side surface at an end position of the first handle 101 and face the second clamp body 20.

For example, the second protruding stop mechanism may be located on the second handle 202, be near the side surface of the second shank portion 204, and face the first clamp body 10, or the second protruding stop mechanism may be located on a side surface at a middle position of the second handle 202 and face the first clamp body 10, or the second protruding stop mechanism may be located on a side surface at an end position of the second handle 202 and face the first clamp body 10.

In another embodiment of the present application, the first protruding stop mechanism and/or the second protruding stop mechanism may be a protruding cylinder, a protruding square column or a protruding column body with an irregular shape.

In another embodiment of the present application, to restrict a larger distance between the first handle 101 and the second handle 202, a first anti-pinch flange (not shown in the figure) may further be provided at a position, corresponding to the second protruding stop mechanism, on the first clamp body 10, and touch and be clamped on the second protruding stop mechanism during narrowing or closing of the jaw opening; and/or a second anti-pinch flange (not shown in the figure) may be provided at a position, corresponding to the first protruding stop mechanism, on the second clamp body 20, and touch and be clamped on the first protruding stop mechanism during narrowing or closing of the jaw opening. The first anti-pinch flange and/or the second anti-pinch flange may be protruding barriers. When the first handle 101 and the second handle 202 move toward each other to approach or close, the first protruding stop mechanism touches and is clamped on the second anti-pinch flange and/or the second protruding stop mechanism touches and is clamped on the first anti-pinch flange, so that if the first clamp jaw 105 and the second clamp jaw 206 suddenly slide off from a workpiece or suddenly become loose by accident or an object being held is accidentally damaged or detached, a user's hand gripping the first handle 101 and the second handle 202 is prevented from being injured.

In another embodiment of the present application, to provide the protruding stop mechanism with cushioning during clamping without causing the shaking of the clamp, at least one of the first protruding stop mechanism, the second protruding stop mechanism, the first anti-pinch flange and the second anti-pinch flange is made of an elastic material such as rubber, silicone or plastic.

The structure in which the first protruding stop mechanism and the first anti-pinch flange are located on the first clamp body 10 described in the foregoing embodiment and the structure in which the second protruding stop mechanism and the second anti-pinch flange are located on the second clamp body 20 may be the same or similar and are equivalent structures. For ease of description, for example, in some embodiments in the following, one of the two clamp bodies has a protruding stop mechanism, and the other clamp body optionally has an anti-pinch flange.

For example, FIG. 2 to FIG. 5 show another clamp according to an embodiment of the present application. The clamp comprises a first clamp body 1 and a second clamp body 2. The first clamp body 1 and the second clamp body 2 intersect. For example, the first clamp body 1 and the second clamp body 2 are relatively fastened by a pivot mechanism 3. The first clamp body 1 and the second clamp body 2 form a jaw opening at one end of the pivot mechanism 3, and have respective handles at the other end of the pivot mechanism 3, the first clamp body 1 and the second clamp body 2 rotate with respect to each other around the pivot mechanism 3 to implement holding of the jaw opening.

The pivot mechanism 3 may be a pivot. For example, the pivot may be a pivot bolt or a pivot screw, wherein the pivot is a cylinder.

The first clamp body 1 comprises a first handle 11, a first clamp jaw 15, and a first shank portion 13 connecting the first handle 11 and the first clamp jaw 15. The second clamp body 2 comprises a second handle 12, a second clamp jaw 16, and a second shank portion 14 connecting the second handle 12 and the second clamp jaw 16.

The first clamp jaw 15 and the second clamp jaw 16 form a jaw opening. A bend exists at an intersection between the first clamp jaw 15 and the first shank portion 13 to form a hook form. A bend exists at an intersection between the second clamp jaw 16 and the second shank portion 14 to form a hook form. In another embodiment of the present application, the first clamp jaw 15 and the second clamp jaw 16 respectively have a first exposed surface 17 and a second exposed surface 18 that are positioned opposite. The first exposed surface 17 and the second exposed surface 18 have sawtooth to facilitate secure clamping of a workpiece.

The second shank portion 14 of the second clamp body 2 is provided with a hollow penetrating long slot 23 in a lengthwise direction of the second shank portion 14. The long slot 23 may be a strip-shaped groove or may be an approximately strip-shaped groove such as an elongated elliptical groove, and a toothed belt is provided on an inner side surface of the long slot 23.

A first through hole 31 is provided at a position on the first clamp body 1 and near the first clamp jaw 15 or at an intersection between the first clamp jaw 15 and the first shank portion 13. The pivot mechanism 3 passes through the first through hole 31 and then continues to pass through the long slot 23 of the second shank portion 14 to relatively fasten the first clamp body 1 and the second clamp body 2. The first clamp body 1 and the pivot mechanism 3 are fastened. The second clamp body 2 rotates around the pivot mechanism 3. In this way, the first clamp body 1 and the second clamp body 2 can rotate with respect to each other around the pivot mechanism 3 to enable the jaw opening formed by the first clamp jaw 15 and the second clamp jaw 16 to open or close, and the first clamp body 1 and the second clamp body 2 can also move relative to each other in a lengthwise direction corresponding to the long slot 23, so that the jaw opening can be expanded or narrowed to be suitable for holding workpieces with different sizes.

In another embodiment of the present application, the pivot mechanism 3 has a smooth rotating surface. For example, a surface that is on the pivot mechanism 3 and is in contact with the long slot 23 is a smooth surface.

In another embodiment of the present application, a toothed belt that meshes with the toothed belt on the inner side surface of the long slot 23 is provided on a surface that is on the pivot mechanism 3 and is in contact with the long slot 23. In this way, when the toothed belt of the pivot mechanism 3 and the toothed belt of the long slot 23 mesh with each other, the pivot mechanism 3 and the second clamp body 2 are fastened, and the first clamp body 1 may relatively rotate around the pivot mechanism 3 to enable the jaw opening formed by the first clamp jaw 15 and the second clamp jaw 16 to open or close.

When the jaw opening needs to be expanded, the first clamp body 1 drives the pivot mechanism 3 to be detached from the toothed belt on the inner side surface of the long slot 23 of the second clamp body 2. The first clamp body 1 is then pulled downward from the top of the long slot 23. In this way, the jaw opening formed by the first clamp jaw 15 and the second clamp jaw 16 is expanded. In this way, when the jaw opening is pulled open, an object is placed in the jaw opening, and the jaw opening is then conveniently narrowed to hold the object adequately.

In another embodiment of the present application, the teeth on the toothed belt on the inner side surface of the long slot 23 and the teeth on the rotating surface of the pivot mechanism 3 are one-way ratchets that mesh with each other. That is, the teeth on the toothed belt on the inner side portion of the long slot 23 all obliquely face one direction. A direction in which the teeth on the rotating surface of the pivot mechanism 3 all obliquely face and the facing direction of the teeth on the toothed belt on the inner side surface of the long slot 23 are opposite. In this way, when a force is applied in an opposite direction of the direction in which the teeth on the inner side surface of the long slot 23 tilt, that is, there are inverted hooks between the teeth on the surface of the pivot mechanism 3 and the teeth on the inner side portion of the long slot 23, an external force is required to detach them such that the pivot mechanism 3 can slide in the long slot 23. In the direction in which the teeth on the inner side surface of the long slot 23 tilt, the pivot mechanism 3 may be automatically detached from the teeth on the toothed belt on the inner side portion of the long slot 23 without needing the intervention of an external force, so as to implement fast one-way slide.

A protruding stop block 26 facing the second clamp body 2 is disposed at a middle position of the first shank portion 13 of the first clamp body 1 or a position on the first shank portion 13 and near the first handle 11. The protruding stop block 26 may be a protruding cylinder, a protruding square column or a protruding column body with an irregular shape. The protruding stop block 26 and the first shank portion 13 may be integrally molded or may be welded or bonded on the first shank portion 13.

During narrowing or closing of the jaw opening, that is, when the first handle 11 and the second handle 12 move toward each other to approach or close, the protruding stop block 26 touches and is clamped on the second clamp body 2, for example, touches and is clamped on the second shank portion 14 or the second handle 12 or an intersection between the second shank portion 14 and the second handle 12, to prevent the first handle 11 and the second handle 12 from further closing. In this way, it can be restricted that the distance between the first handle 11 and the second handle 12 is still greater than a particular threshold when they are prevented from closing, so that if the jaw opening formed by the first clamp jaw 15 and the second clamp jaw 16 suddenly slides off from a workpiece or suddenly becomes loose by accident or an object being held is accidentally damaged or detached, a user's hand gripping the first handle 11 and the second handle 12 is prevented from being injured.

In another embodiment of the present application, to restrict a larger distance between the first handle 11 and the second handle 12, a protruding anti-pinch flange 27 may further be optionally provided at a position on the second shank portion 14 or the second handle 12 of the second clamp body 2 and corresponding to the protruding stop block 26. For example, the anti-pinch flange 27 is disposed at the position on the second shank portion 14 of the second clamp body 2 and near the second handle 12, or, the anti-pinch flange 27 is disposed at the position on the second handle 12 and near the second shank portion 14, and the anti-pinch flange 27 may be a protruding barrier or a protruding edge or a protrusion.

During narrowing or closing of the jaw opening, that is, when the first handle 11 and the second handle 12 move toward each other to approach or close, the protruding stop block 26 touches and is clamped on the anti-pinch flange 27, to prevent the first handle 11 and the second handle 12 from further closing, so that if the first clamp jaw 15 and the second clamp jaw 16 suddenly slide off from a workpiece or suddenly become loose by accident or an object being held is accidentally damaged or detached, a user's hand gripping the first handle 11 and the second handle 12 is prevented from being injured.

In another embodiment of the present application, to provide the protruding stop block 26 with cushioning during clamping without causing the shaking of the clamp, either of or both the protruding stop block 26 and the anti-pinch flange 27 may be made of an elastic material such as rubber, silicone or plastic.

In another embodiment of the present application, another protruding stop block having the same structure as the protruding stop block 26 may be equivalently disposed at the same time on the second shank portion 14 of the second clamp body 2, and another anti-pinch flange may further be optionally disposed at a position on the first shank portion 13 of the first clamp body 1 or at the intersection between the first shank portion 13 and the first clamp jaw 15 and corresponding to the another protruding stop block. The structure of another anti-pinch flange is the same as that of the anti-pinch flange 27. Details are not described herein again.

Figure 6:
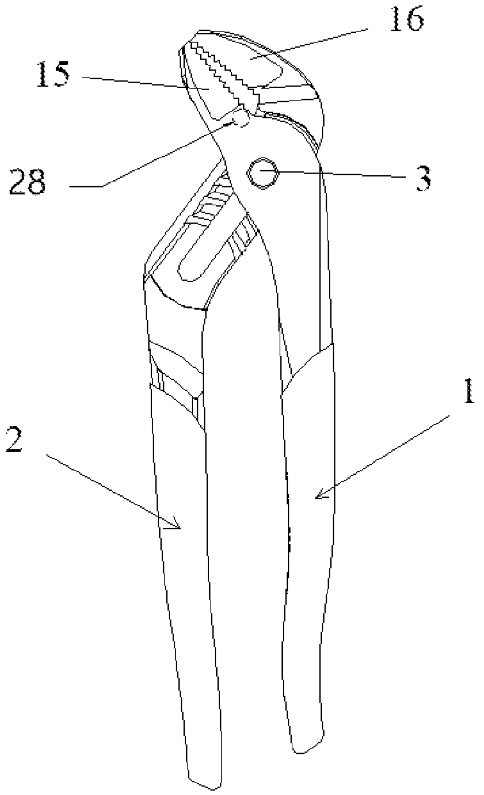
FIG. 6 is a schematic structural diagram when a jaw opening of another clamp is closed.
Figure 7:
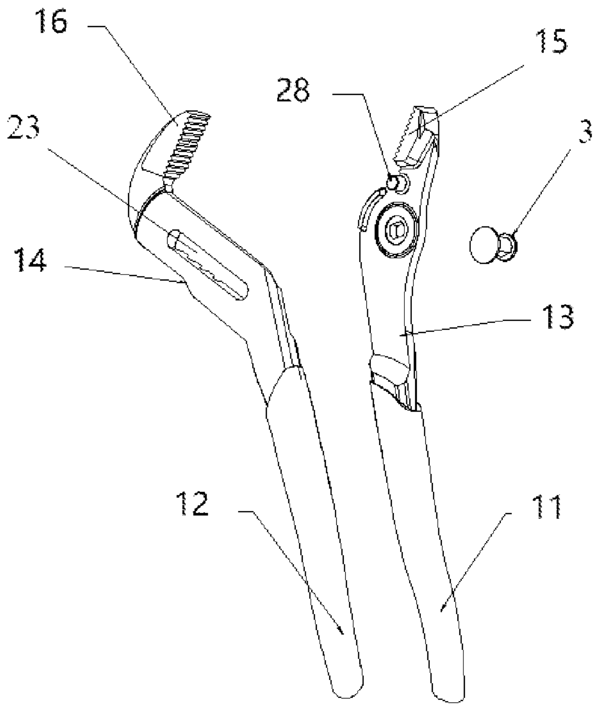
FIG. 7 is a schematic structural exploded view of the clamp in FIG. 6 according to another embodiment of the present application.
Figure 8:
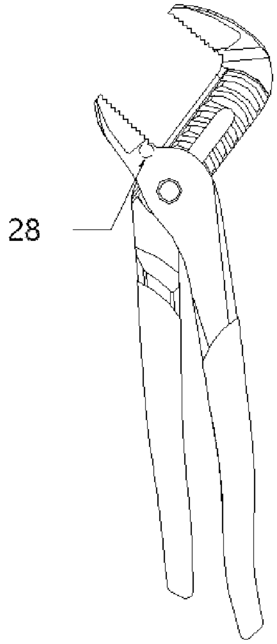
FIG. 8 is a schematic structural diagram of a jaw opening of the clamp in FIG. 6 being expanded.

For another example, FIG. 6 to FIG. 8 show another clamp according to another embodiment of the present application. The structure of the clamp in this embodiment is basically similar to the structure of the clamp described in FIG. 2 to FIG. 5. A difference lies in that the protruding stop mechanism is a protruding stop block 28. The protruding stop block 28 is located at a position on the first shank portion 13 of the first clamp body 1 and near the first clamp jaw 15 and faces the second clamp body 2. In another embodiment of the present application, the protruding stop block 28 may be alternatively located at an intersection between the first shank portion 13 and the first clamp jaw 15 and faces the second clamp body 2. The structure and shape of the protruding stop block 28 are the same as those of the protruding stop block 26. Details are not described herein again.

During narrowing or closing of the jaw opening, that is, when the first handle 11 and the second handle 12 move toward each other to approach or close, the protruding stop block 28 touches and is clamped on the second shank portion 14 or at the intersection between the second shank portion 14 and the second clamp jaw 16, to prevent the first handle 11 and the second handle 12 from further closing. In this way, it can be restricted that the distance between the first handle 11 and the second handle 12 is still greater than a particular threshold when they are prevented from closing, so that if the jaw opening suddenly slides off from a workpiece or suddenly becomes loose by accident or an object being held is accidentally damaged or detached, a user's hand gripping the first handle 11 and the second handle 12 is prevented from being injured.

Figure 2:
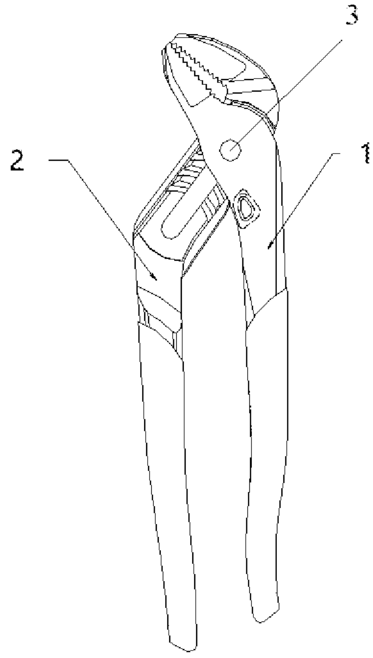
FIG. 2 is a schematic structural diagram when a jaw opening of another clamp is closed.
Figure 3:
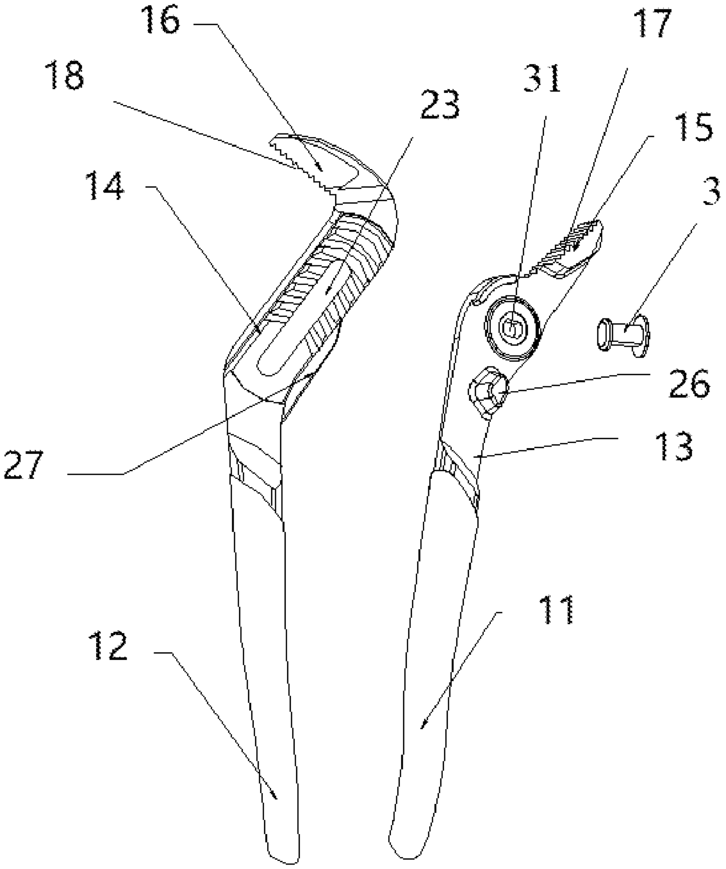
FIG. 3 is a schematic structural exploded view of the clamp in FIG. 2 according to another embodiment of the present application.
Figure 4:
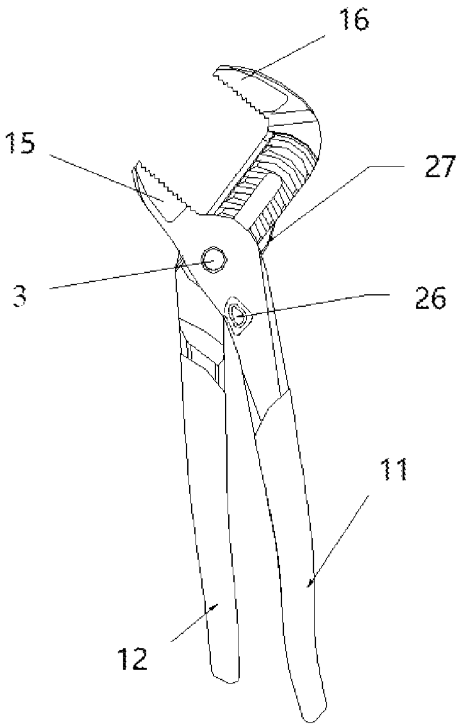
FIG. 4 is a schematic structural diagram when a jaw opening of the clamp in FIG. 2 is expanded.
Figure 5:
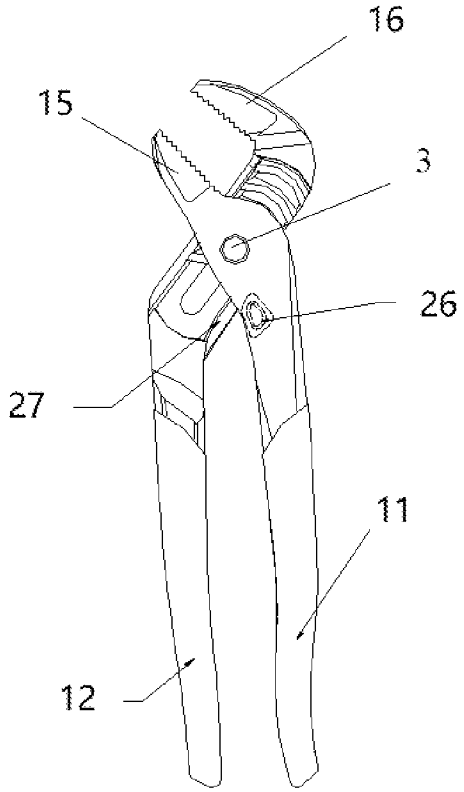
FIG. 5 is a schematic structural diagram when a jaw opening of the clamp in FIG. 2 is opened.

Similar to the structure in FIG. 2 to FIG. 4, an anti-pinch flange corresponding to the protruding stop block 28 may be disposed on the second shank portion 14. The protruding stop block 28 touches and is clamped on the anti-pinch flange during narrowing or closing of the jaw opening, to prevent the first handle 11 and the second handle 12 from further closing, so that if the jaw opening suddenly slides off from a workpiece or suddenly becomes loose by accident or an object being held is accidentally damaged or detached, a user's hand gripping the first handle 11 and the second handle 12 is prevented from being injured.

In another embodiment of the present application, another protruding stop block having the same structure as the protruding stop block 28 may be equivalently disposed at the same time at a position, near the second clamp jaw 16, on the second shank portion 14 of the second clamp body 2 or at an intersection between the second shank portion 14 and the second clamp jaw 16, and another anti-pinch flange may further be optionally disposed at a position on the first shank portion 13 of the first clamp body 1 or at the intersection between the first shank portion 13 and the first clamp jaw 15 and corresponding to the another protruding stop block. The structure of another anti-pinch flange is the same as the anti-pinch flange of the second clamp body 2. Details are not described herein again.

Figure 9:
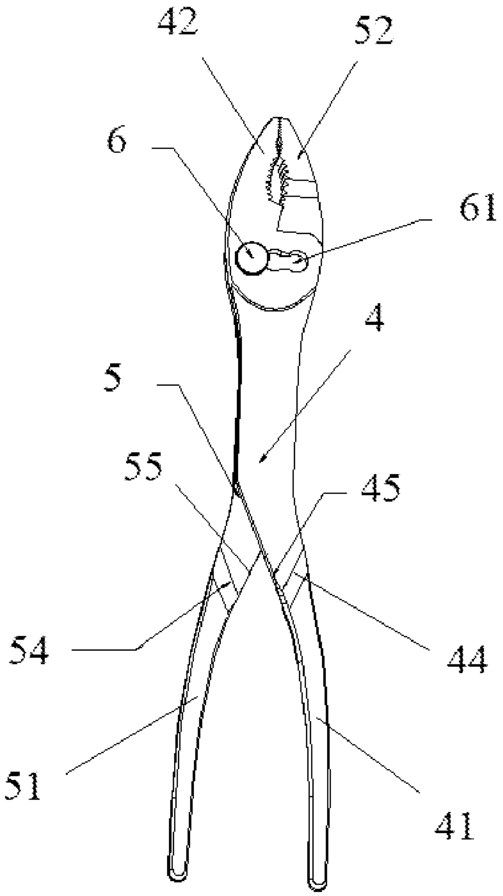
FIG. 9 is a schematic structural diagram when a jaw opening of another clamp is closed.
Figure 10:
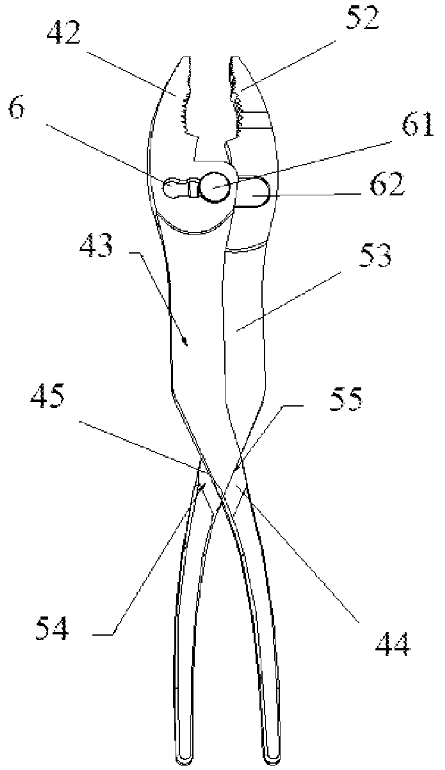
FIG. 10 is a schematic structural diagram of a jaw opening of the clamp in FIG. 9 being expanded.
Figure 11:
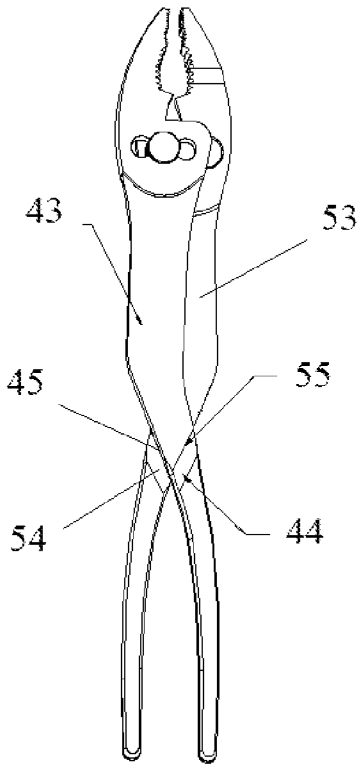
FIG. 11 is a schematic structural diagram when a jaw opening of the clamp in FIG. 9 is opened.

For another example, FIG. 9 to FIG. 11 show another clamp according to another embodiment of the present application. The clamp comprises a first clamp body 4 and a second clamp body 5. The first clamp body 4 and the second clamp body 5 intersect. For example, the first clamp body 4 and the second clamp body 5 are relatively fastened by a pivot mechanism 6. The first clamp body 4 and the second clamp body 5 form a jaw opening at one end of the pivot mechanism 6 and have respective handles at the other end of the pivot mechanism 6. The first clamp body 4 and the second clamp body 5 rotate with respect to each other around the pivot mechanism 6 to implement holding.

The pivot mechanism 6 may be a pivot. For example, the pivot may be a pivot bolt or a pivot screw, wherein the pivot is a cylinder.

The first clamp body 4 comprises a first handle 41, a first clamp jaw 42, and a first shank portion 43 connecting the first handle 41 and the first clamp jaw 42. The second clamp body 5 comprises a second handle 51, a second clamp jaw 52, and a second shank portion 53 connecting the second handle 51 and the second clamp jaw 52.

The first clamp jaw 42 and the second clamp jaw 52 form a jaw opening. A bend exists at an intersection between the first clamp jaw 42 and the first shank portion 43 to form a hook form. A bend exists at an intersection between the second clamp jaw 52 and the second shank portion 53 to form a hook form. In another embodiment of the present application, the first clamp jaw 42 and the second clamp jaw 52 respectively have a first exposed surface and a second exposed surface that are positioned opposite. The first exposed surface and the second exposed surface may have a sawtooth form to facilitate secure clamping of a workpiece.

A transverse hollow penetrating first long slot 61 is provided in a lengthwise direction of the first shank portion 43 at a position on the first shank portion 43 and near the first clamp jaw 42 or the intersection between the first shank portion 43 and the first clamp jaw 42. The first long slot 61 may be a rectangular groove or a groove that is formed by two, three or more round holes in communication. The pivot mechanism 6 may be located in different round holes and move in different round holes, to enable the jaw opening to be expanded or narrowed, and a toothed belt is provided on an inner side surface of the first long slot 61.

A transverse hollow penetrating second long slot 62 is provided in a lengthwise direction of the second shank portion 53 at a position on the second shank portion 53 and near the second clamp jaw 52 or at the intersection between the second shank portion 53 and the second clamp jaw 52. The second long slot 62 may be a rectangular groove or a groove that is formed by two, three or more round holes in communication. The pivot mechanism 6 may be located in different round holes and move in different round holes, to enable the jaw opening to be expanded or narrowed, and a toothed belt is provided on an inner side surface of the second long slot 62.

The first long slot 61 and the second long slot 62 correspondingly overlap to form a through groove. The pivot mechanism 6 passes through the first long slot 61 and then continues to pass through the second long slot 62 to relatively fasten the first clamp body 4 and the second clamp body 5. The second clamp body 5 and the pivot mechanism 6 are fastened. The first clamp body 4 rotates around the pivot mechanism 6. In this way, the first clamp body 4 and the second clamp body 5 can rotate with respect to each other around the pivot mechanism 6 to enable the jaw opening formed by the first clamp jaw 42 and the second clamp jaw 52 to open or close, and the first clamp body 4 and the second clamp body 5 can also move relative to each other in an overlapping space between the first long slot 61 and the second long slot 62, so that the jaw opening can be expanded or narrowed to be suitable for holding workpieces with different sizes.

In another embodiment of the present application, the rotating surface of the pivot mechanism 6 is a smooth surface, and the inner side surfaces of the first long slot 61 and the second long slot 62 may also be smooth surfaces.

When the jaw opening needs to be expanded, the first clamp body 4 and the second clamp body 5 move away from each other in opposite directions until the pivot mechanism 6 is stopped by the inner side surface at one end of the first long slot 61 to reach a maximum jaw opening expansion distance, that is, stopped by opposite end sides of the first long slot 61 and the second long slot 62. In this way, the jaw opening is expanded. In this way, when the jaw opening is pulled open, an object is placed in the jaw opening, and the jaw opening is then conveniently narrowed to hold the object adequately.

In another embodiment of the present application, a toothed belt is provided on the inner side surfaces of both the first long slot 61 and the second long slot 62, and a toothed belt is also provided on the surface of the pivot mechanism 6 and meshes with the toothed belts of the first long slot 61 and the second long slot 62. The pivot mechanism 6 can slide only after it is detached from the teeth on the toothed belts on the inner side surfaces of the first long slot 61 and the second long slot 62.

A first protruding stop edge 44 facing the second clamp body 5 is disposed on the first shank portion 43 of the first clamp body 4 and near the first handle 41. In another embodiment of the present application, the first protruding stop edge 44 may be located at a position on the first handle 41 and near the first shank portion 43 and face the second clamp body 5. In another embodiment of the present application, the first protruding stop edge 44 may be located at the intersection between the first handle 41 and the first shank portion 43 and face the second clamp body 5. The first protruding stop edge 44 may be an annular protruding edge or annular protruding belt surrounding the first clamp body 4 or the first protruding stop edge 44 is only a protruding edge facing the second clamp body 5. In another embodiment of the present application, the first protruding stop edge 44 may be an extending protruding edge at the intersection between the first handle 41 and the first shank portion 43.

A second protruding stop edge 54 facing the first clamp body 4 is disposed on the second shank portion 53 of the second clamp body 5 and near the second handle 51. In another embodiment of the present application, the second protruding stop edge 54 may be located at a position on the second handle 51 and near the second shank portion 53 and face the first clamp body 4. In another embodiment of the present application, the second protruding stop edge 54 may be located at an intersection between the second handle 51 and the second shank portion 53 and face the first clamp body 4. The second protruding stop edge 54 may be an annular protruding edge or annular protruding belt surrounding the second clamp body 5, or the second protruding stop edge 54 is only a protruding edge facing the first clamp body 4. In another embodiment of the present application, the second protruding stop edge 54 may be an extending protruding edge at the intersection between the second handle 51 and the second shank portion 53.

In another embodiment of the present application, the first protruding stop edge 44 and the second protruding stop edge 54 may be disposed opposite in an aligned manner or disposed opposite in a staggered manner.

When the first protruding stop edge 44 and the second protruding stop edge 54 are disposed opposite in an aligned manner, during narrowing or closing of the jaw opening, that is, when the first handle 41 and the second handle 51 move toward each other to approach or close, the first protruding stop edge 44 touches and is clamped on the second clamp body 5, and at the same time the second protruding stop edge 54 touches and is clamped on the first clamp body 4. Optionally, the first protruding stop edge 44 touches and is clamped on the second protruding stop edge 54. Therefore, the first handle 41 and the second handle 51 can be prevented from further closing. In this way, it can be restricted that the distance between the first handle 41 and the second handle 51 is still greater than a particular threshold when they are prevented from closing, so that if the first clamp jaw 42 and the second clamp jaw 52 suddenly slide off from a workpiece or suddenly become loose by accident or an object being held is accidentally damaged or detached, a user's hand gripping the first handle 41 and the second handle 51 is prevented from being injured.

In another embodiment of the present application, when the first protruding stop edge 44 and the second protruding stop edge 54 are disposed opposite in a staggered manner, during narrowing or closing of the jaw opening, that is, when the first handle 41 and the second handle 51 move toward each other to approach or close, one of the first protruding stop edge 44 and the second protruding stop edge 54 that is closer to its shank portion first touches and is clamped on the opposite shank portion, and the other protruding stop edge that is farther from its shank portion is clamped when the first one protruding stop edge crosses a clamping position (for example, there may be an excessively large force) and the jaw opening continues to close. The other protruding stop edge touches and is clamped on the opposite shank portion to provide extra safety.

In another embodiment of the present application, to restrict a larger distance between the first handle 41 and the second handle 51, a first anti-pinch flange 45 corresponding to the second protruding stop edge 54 may further be disposed on the first clamp body 4. During narrowing or closing of the jaw opening, the second protruding stop edge 54 touches and is clamped on the first anti-pinch flange 45, so that if the first clamp jaw 42 and the second clamp jaw 52 suddenly slide off from a workpiece or suddenly become loose by accident or an object being held is accidentally damaged or detached, a user's hand gripping the first handle 41 and the second handle 51 is prevented from being injured.

In another embodiment of the present application, to restrict a larger distance between the first handle 41 and the second handle 51, a second anti-pinch flange 55 corresponding to the first protruding stop edge 44 may further be disposed on the second clamp body 5. During narrowing or closing of the jaw opening, the first protruding stop edge 44 touches and is clamped on the second anti-pinch flange 55, so that if the first clamp jaw 42 and the second clamp jaw 52 suddenly slide off from a workpiece or suddenly become loose by accident or an object being held is accidentally damaged or detached, a user's hand gripping the first handle 41 and the second handle 51 is prevented from being injured.

In another embodiment of the present application, the first anti-pinch flange 45 and the second anti-pinch flange 55 may be protruding barriers.

In another embodiment of the present application, to provide the first protruding stop edge 44 and/or the second protruding stop edge 54 with cushioning during clamping without causing the shaking of the clamp, at least one of the first protruding stop edge 44, the second protruding stop edge 54, the first anti-pinch flange 45 and the second anti-pinch flange 55 may be made of an elastic material such as rubber, silicone or plastic.

Figure 12:
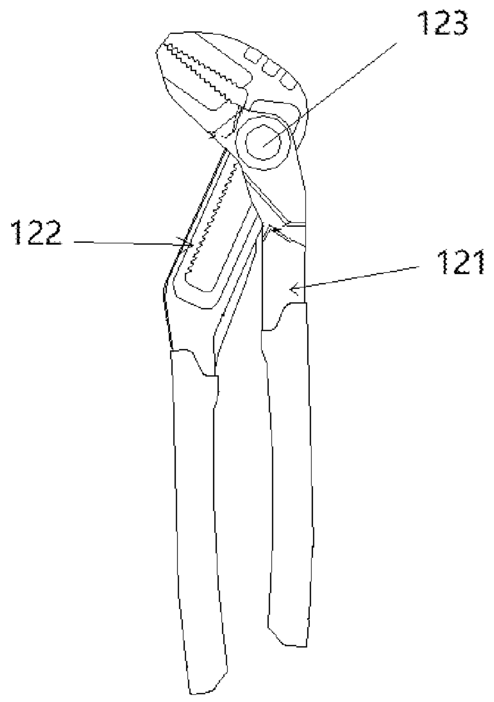
FIG. 12 is a schematic structural diagram when a jaw opening of another clamp is closed.

FIG. 12 shows another clamp according to another embodiment of the present application. The clamp comprises a first clamp body 121 and a second clamp body 122. The first clamp body 121 and the second clamp body 122 intersect. For example, the first clamp body 121 and the second clamp body 122 are relatively fastened by a pivot mechanism 123. The first clamp body 121 and the second clamp body 122 form a jaw opening at one end of the pivot mechanism 123, and have respective handles at the other end of the pivot mechanism 123, the first clamp body 121 and the second clamp body 122 rotate with respect to each other around the pivot mechanism 123 to implement holding of the jaw opening.

The pivot mechanism 123 may be a pivot. For example, the pivot may be a pivot bolt or a pivot screw, wherein the pivot is a cylinder.

Figure 13:
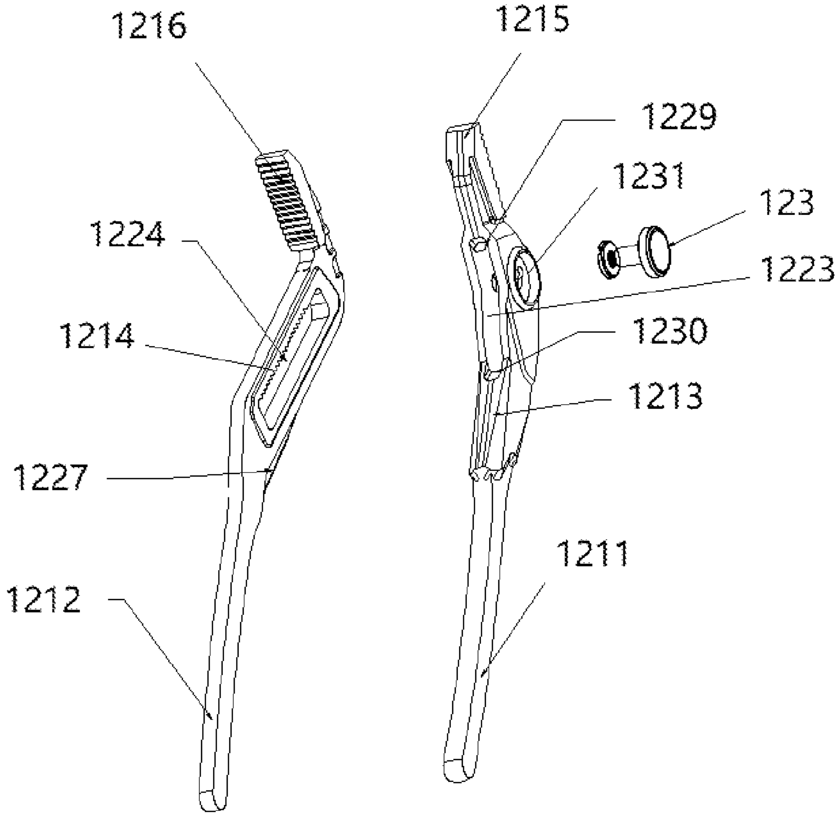
FIG. 13 is a schematic structural exploded view of the clamp in FIG. 12 according to another embodiment of the present application.

As shown in FIG. 13, the first clamp body 121 comprises a first handle 1211, a first clamp jaw 1215, and a first shank portion 1213 connecting the first handle 1211 and the first clamp jaw 1215. The second clamp body 122 comprises a second handle 1212, a second clamp jaw 1216, and a second shank portion 1214 connecting the second handle 1212 and the second clamp jaw 1216.

The first clamp jaw 1215 and the second clamp jaw 1216 form a jaw opening. A bend exists at an intersection between the first clamp jaw 1215 and the first shank portion 1213 to form a hook form. A bend exists at an intersection between the second clamp jaw 1216 and the second shank portion 1214 to form a hook form. In another embodiment of the present application, the first clamp jaw 1215 and the second clamp jaw 1216 have exposed surfaces that are positioned opposite. Both the exposed surfaces have sawtooth to facilitate secure clamping of a workpiece.

The first shank portion 1213 of the first clamp body 121 is provided with a hollow penetrating first long slot 1223 in a lengthwise direction of the first shank portion 1213. The first long slot 1223 may be a strip-shaped groove or may be an approximately strip-shaped groove such as an elongated elliptical groove. A tilt upper stop edge 1229 is provided on an inner side surface, near the first clamp jaw 1215, of the first long slot 1223. A tilt lower stop edge 1230 is provided on an inner side surface, near the first handle 1211, of the first long slot 1223.

The second shank portion 1214 of the second clamp body 122 is provided with a hollow penetrating second long slot 1224 in a lengthwise direction of the second shank portion 1214. The second long slot 1224 may be a strip-shaped groove or may be an approximately strip-shaped groove such as an elongated elliptical groove, and a toothed belt is provided on an inner side surface of the second long slot 1224.

A first through hole 1231 is provided at a position on the first shank portion 1213 of the first clamp body 121 and near the first clamp jaw 1215 or at an intersection between the first clamp jaw 1215 and the first shank portion 1213.

The second clamp jaw 1216 of the second clamp body 122 passes through the first long slot 1223 provided in the first shank portion 1213 of the first clamp body 121 to intersect with the first clamp body 121, and the pivot mechanism 123 then passes through the first through hole 1231 and then continues to pass through the second long slot 1224 of the second shank portion 1214 to relatively fasten the first clamp body 121 and the second clamp body 122 intersecting with each other. The first clamp body 121 and the pivot mechanism 123 are fastened. The second clamp body 122 rotates around the pivot mechanism 123. In this way, the first clamp body 121 and the second clamp body 122 can rotate with respect to each other around the pivot mechanism 123 to enable the jaw opening formed by the first clamp jaw 1215 and the second clamp jaw 1216 to open or close, and the first clamp body 121 and the second clamp body 122 can also move relative to each other in a lengthwise direction corresponding to the second long slot 1224, so that the jaw opening can be expanded or narrowed to be suitable for holding workpieces with different sizes.

In another embodiment of the present application, the pivot mechanism 123 has a smooth rotating surface. For example, a surface that is on the pivot mechanism 123 and is in contact with the second long slot 1224 is a smooth surface.

In another embodiment of the present application, a toothed belt that meshes with the toothed belt on the inner side surface of the second long slot 1224 is provided on a surface that is on the pivot mechanism 123 and is in contact with the second long slot 1224. In this way, when the toothed belt of the pivot mechanism 123 and the toothed belt of the second long slot 1224 mesh with each other, the pivot mechanism 123 and the second clamp body 122 are fastened, and the first clamp body 121 may relatively rotate around the pivot mechanism 123 to enable the jaw opening formed by the first clamp jaw 1215 and the second clamp jaw 1216 to open or close.

Figure 14:
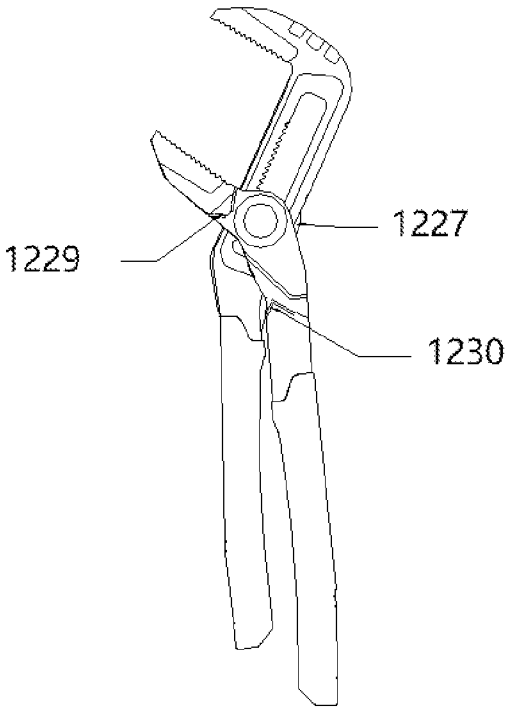
FIG. 14 is a schematic structural diagram of a jaw opening of the clamp in FIG. 12 being expanded.

As shown in FIG. 14, when the jaw opening needs to be expanded, the first clamp body 121 drives the pivot mechanism 123 to be detached from the toothed belt on the inner side surface of the second long slot 1224 of the second clamp body 122. The first clamp body 121 is then pulled downward from the top of the second long slot 1224. In this way, the jaw opening formed by the first clamp jaw 1215 and the second clamp jaw 1216 is expanded. In this way, when the jaw opening is pulled open, an object is placed in the jaw opening, and the jaw opening is then conveniently narrowed to hold the object adequately.

In another embodiment of the present application, the teeth on the toothed belt on the inner side surface of the second long slot 1224 and the teeth on the rotating surface of the pivot mechanism 123 are one-way ratchets that mesh with each other. That is, the teeth on the toothed belt on the inner side portion of the second long slot 1224 all obliquely face one direction. A direction in which the teeth on the rotating surface of the pivot mechanism 123 all obliquely face and the facing direction of the teeth on the toothed belt on the inner side surface of the second long slot 1224 are opposite. In this way, when a force is applied in an opposite direction of the direction in which the teeth on the inner side surface of the second long slot 1224 tilt, that is, there are inverted hooks between the teeth on the surface of the pivot mechanism 123 and the teeth on the inner side portion of the second long slot 1224, an external force is required to detach them such that the pivot mechanism 123 can slide in the long slot 23. In the direction in which the teeth on the inner side surface of the second long slot 1224 tilt, the pivot mechanism 123 may be automatically detached from the teeth on the toothed belt on the inner side portion of the second long slot 1224 without needing the intervention of an external force, so as to implement fast one-way slide.

The tilt upper stop edge 1229 and the tilt lower stop edge 1230 of the first long slot 1223 are sides with a particular tilt angle of the inner side surfaces at two opposite ends of the first long slot 1223. For example, the tilt angle may be 30° -80° .

During narrowing or closing of the jaw opening, that is, when the first handle 1211 and the second handle 1212 move toward each other to approach or close, the tilt upper stop edge 1229 touches and is clamped on the second shank portion 1214, and the tilt lower stop edge 1230 touches and is clamped on the second handle 1212 or at the intersection between the second shank portion 1214 and the second handle 1212 or on the second shank portion 1214, to prevent the first handle 1211 and the second handle 1212 from further closing. In this way, it can be restricted that the distance between the first handle 1211 and the second handle 1212 is still greater than a particular threshold when they are prevented from closing, so that if the jaw opening formed by the first clamp jaw 1215 and the second clamp jaw 1216 suddenly slides off from a workpiece or suddenly becomes loose by accident or an object being held is accidentally damaged or detached, a user's hand gripping the first handle 1211 and the second handle 1212 is prevented from being injured.

In another embodiment of the present application, to restrict a larger distance between the first handle 1211 and the second handle 1212, a protruding anti-pinch flange 1227 may further be optionally provided at a position on the second shank portion 1214 or the second handle 1212 of the second clamp body 122 and corresponding to the tilt lower stop edge 1230. For example, the anti-pinch flange 1227 is disposed at a position on the second shank portion 1214 of the second clamp body 122 and near the second handle 1212, or the anti-pinch flange 1227 is disposed at a position on the second handle 1212 and near the second shank portion 1214, or the anti-pinch flange 1227 is disposed at an intersection between the second handle 1212 and the second shank portion 1214. The anti-pinch flange 1227 may be a protruding barrier or a protruding edge or a protrusion.

During narrowing or closing of the jaw opening, that is, when the first handle 1211 and the second handle 1212 move toward each other to approach or close, the tilt lower stop edge 1230 touches and is clamped on the anti-pinch flange 1227, to prevent the first handle 1211 and the second handle 1212 from further closing, so that if the first clamp jaw 1215 and the second clamp jaw 1216 suddenly slide off from a workpiece or suddenly become loose by accident or an object being held is accidentally damaged or detached, a user's hand gripping the first handle 1211 and the second handle 1212 is prevented from being injured.

In another embodiment of the present application, to provide the tilt upper stop edge 1229 and the tilt lower stop edge 1230 with cushioning during clamping without causing the shaking of the clamp, any one of or all the tilt upper stop edge 1229, the tilt lower stop edge 1230, and the anti-pinch flange 1227 may be made of an elastic material such as rubber, silicone or plastic.

Figure 15:
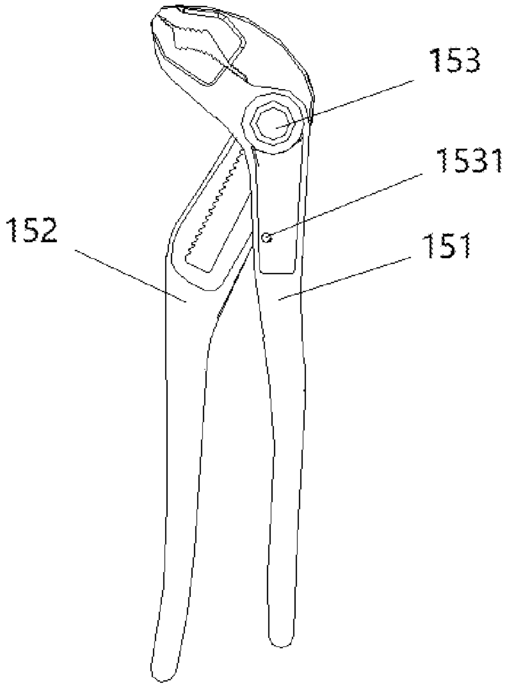
FIG. 15 is a schematic structural diagram when a jaw opening of another clamp is closed.

FIG. 15 shows another clamp according to another embodiment of the present application. The clamp comprises a first clamp body 151 and a second clamp body 152. The first clamp body 151 and the second clamp body 152 intersect. For example, the first clamp body 151 and the second clamp body 152 are relatively fastened by a pivot mechanism 153. The first clamp body 151 and the second clamp body 152 form a jaw opening at one end of the pivot mechanism 153, and have respective handles at the other end of the pivot mechanism 153, the first clamp body 151 and the second clamp body 152 rotate with respect to each other around the pivot mechanism 153 to implement holding of the jaw opening.

The pivot mechanism 153 may be a pivot. For example, the pivot may be a pivot bolt or a pivot screw, wherein the pivot is a cylinder.

Figure 16:
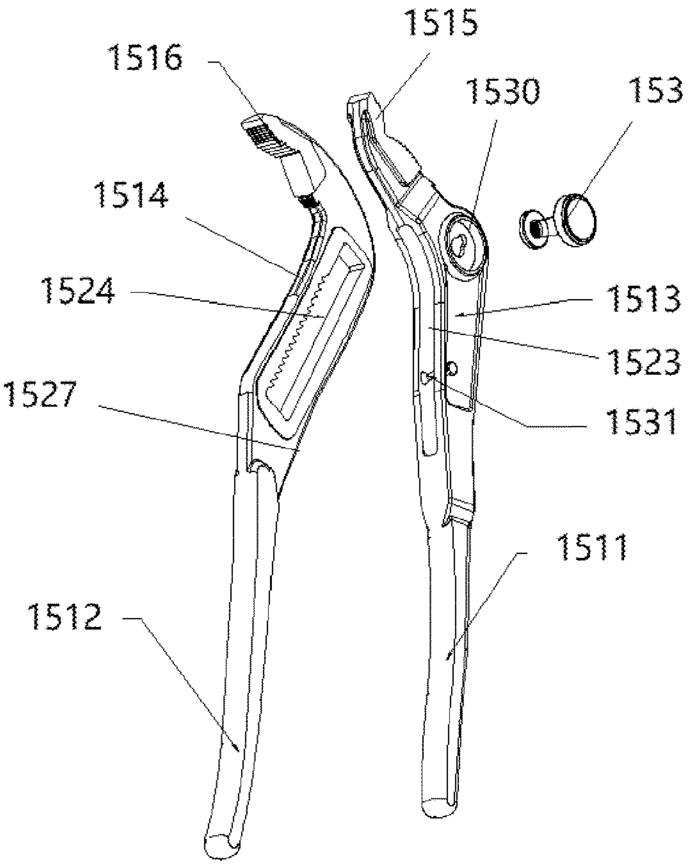
FIG. 16 is a schematic structural exploded view of the clamp in FIG. 15 according to another embodiment of the present application.

As shown in FIG. 16, the first clamp body 151 comprises a first handle 1511, a first clamp jaw 1515, and a first shank portion 1513 connecting the first handle 1511 and the first clamp jaw 1515. The second clamp body 152 comprises a second handle 1512, a second clamp jaw 1516, and a second shank portion 1514 connecting the second handle 1512 and the second clamp jaw 1516.

The first clamp jaw 1515 and the second clamp jaw 1516 form a jaw opening. A bend exists at an intersection between the first clamp jaw 1515 and the first shank portion 1513 to form a hook form. A bend exists at an intersection between the second clamp jaw 1516 and the second shank portion 1514 to form a hook form. In another embodiment of the present application, the first clamp jaw 1515 and the second clamp jaw 1516 have exposed surfaces that are positioned opposite. Both the exposed surfaces have sawtooth to facilitate secure clamping of a workpiece.

The first shank portion 1513 of the first clamp body 151 is provided with a hollow penetrating first long slot 1523 in a lengthwise direction of the first shank portion 1513. The first long slot 1523 may be a strip-shaped groove or may be an approximately strip-shaped groove such as an elongated elliptical groove.

A pin shaft 1531 transversely passing through the first long slot 1523 is disposed at a position, near the first handle 1511, of the first long slot 1523. For example, the pin shaft 1531 may be a round pin. In another embodiment of the present application, the pin shaft 1531 and the first shank portion 1513 may be integrally molded. Two side surfaces with the first long slot 1523 of the first shank portion 1513 may be respectively provided with one fastening hole. The pin shaft 1531 passes through the first long slot 1523 to be fastened in the two fastening holes. For example, the pin shaft 1531 and the two fastening holes are fastened in a threaded manner or fastened in a welding manner or secured.

The second shank portion 1514 of the second clamp body 152 is provided with a hollow penetrating second long slot 1524 in a lengthwise direction of the second shank portion 1514. The second long slot 1524 may be a strip-shaped groove or may be an approximately strip-shaped groove such as an elongated elliptical groove, and a toothed belt is provided on an inner side surface of the second long slot 1524.

A first through hole 1530 is provided at a position on the first shank portion 1513 of the first clamp body 151 and near the first clamp jaw 1515 or at an intersection between the first clamp jaw 1515 and the first shank portion 1513.

The second clamp jaw 1516 and the second shank portion 1514 of the second clamp body 152 pass through a hollow part from the pin shaft 1531 to the first clamp jaw 1515 of the first long slot 1523 to intersect. The pivot mechanism 153 then passes through the first through hole 1530 and then continues to pass through the second long slot 1524 of the second shank portion 1514 to relatively fasten the first clamp body 151 and the second clamp body 152 intersecting with each other. The first clamp body 151 and the pivot mechanism 153 are fastened. The second clamp body 152 rotates around the pivot mechanism 153. In this way, the first clamp body 151 and the second clamp body 152 can rotate with respect to each other around the pivot mechanism 153 to enable the jaw opening formed by the first clamp jaw 1515 and the second clamp jaw 1516 to open or close, and the first clamp body 151 and the second clamp body 152 can also move relative to each other in a lengthwise direction corresponding to the second long slot 1524, so that the jaw opening can be expanded or narrowed to be suitable for holding workpieces with different sizes.

In another embodiment of the present application, the pivot mechanism 153 has a smooth rotating surface. For example, a surface that is on the pivot mechanism 153 and is in contact with the second long slot 1524 is a smooth surface.

In another embodiment of the present application, a toothed belt that meshes with the toothed belt on the inner side surface of the second long slot 1524 is provided on a surface that is on the pivot mechanism 153 and is in contact with the second long slot 1524. In this way, when the toothed belt of the pivot mechanism 153 and the toothed belt of the second long slot 1524 mesh with each other, the pivot mechanism 153 and the second clamp body 152 are fastened, and the first clamp body 151 may relatively rotate around the pivot mechanism 153 to enable the jaw opening formed by the first clamp jaw 1515 and the second clamp jaw 1516 to open or close.

Figure 17:
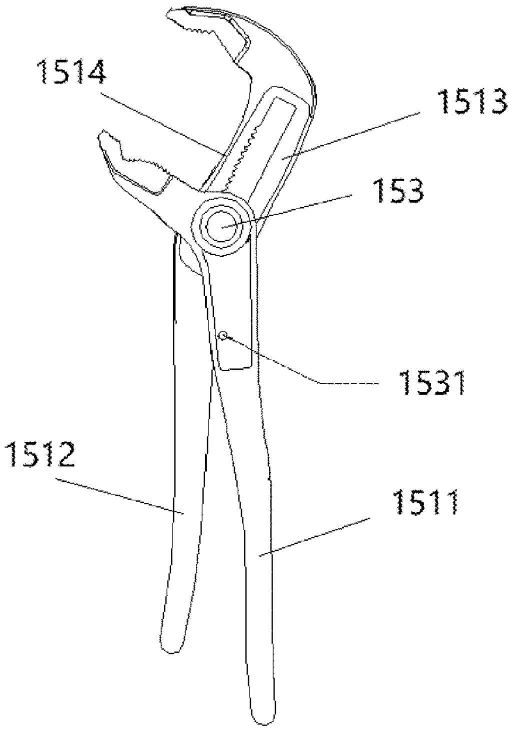
FIG. 17 is a schematic structural diagram when a jaw opening of the clamp shown in FIG. 15 is expanded.

As shown in FIG. 17, when the jaw opening needs to be expanded, the first clamp body 151 drives the pivot mechanism 153 to be detached from the toothed belt on the inner side surface of the second long slot 1524 of the second clamp body 152. The first clamp body 151 is then pulled downward from the top of the second long slot 1524. In this way, the jaw opening formed by the first clamp jaw 1515 and the second clamp jaw 1516 is expanded. In this way, when the jaw opening is pulled open, an object is placed in the jaw opening, and the jaw opening is then conveniently narrowed to hold the object adequately.

In another embodiment of the present application, the teeth on the toothed belt on the inner side surface of the second long slot 1524 and the teeth on the rotating surface of the pivot mechanism 153 are one-way ratchets that mesh with each other. That is, the teeth on the toothed belt on the inner side portion of the second long slot 1524 all obliquely face one direction. A direction in which the teeth on the rotating surface of the pivot mechanism 153 all obliquely face and the facing direction of the teeth on the toothed belt on the inner side surface of the second long slot 1524 are opposite. In this way, when a force is applied in an opposite direction of the direction in which the teeth on the inner side surface of the second long slot 1524 tilt, that is, there are inverted hooks between the teeth on the surface of the pivot mechanism 153 and the teeth on the inner side portion of the second long slot 1524, an external force is required to detach them such that the pivot mechanism 153 can slide in the long slot 23. In the direction in which the teeth on the inner side surface of the second long slot 1524 tilt, the pivot mechanism 153 may be automatically detached from the teeth on the toothed belt on the inner side portion of the second long slot 1524 without needing the intervention of an external force, so as to implement fast one-way slide.

During narrowing or closing of the jaw opening, that is, when the first handle 1511 and the second handle 1512 move toward each other to approach or close, the pin shaft 1531 touches and is clamped on the second shank portion 1514, or the pin shaft 1531 touches and is clamped on the second handle 1512 or at the intersection between the second shank portion 1514 and the second handle 1512, to prevent the first handle 1511 and the second handle 1512 from further closing. In this way, it can be restricted that the distance between the first handle 1511 and the second handle 1512 is still greater than a particular threshold when they are prevented from closing, so that if the jaw opening formed by the first clamp jaw 1515 and the second clamp jaw 1516 suddenly slides off from a workpiece or suddenly becomes loose by accident or an object being held is accidentally damaged or detached, a user's hand gripping the first handle 1511 and the second handle 1512 is prevented from being injured.

In another embodiment of the present application, to restrict a larger distance between the first handle 1511 and the second handle 1512, a protruding anti-pinch flange 1527 may further be optionally provided at a position on the second shank portion 1514 or the second handle 1512 of the second clamp body 152 and corresponding to the pin shaft 1531. For example, the anti-pinch flange 1527 is disposed at a position on the second shank portion 1514 of the second clamp body 152 and near the second handle 1512, or the anti-pinch flange 1527 is disposed at a position on the second handle 1512 and near the second shank portion 1514, or the anti-pinch flange 1527 is disposed at the intersection between the second handle 1512 and the second shank portion 1514. The anti-pinch flange 1527 may be a protruding barrier or a protruding edge or a protrusion.

During narrowing or closing of the jaw opening, that is, when the first handle 1511 and the second handle 1512 move toward each other to approach or close, the pin shaft 1531 touches and is clamped on the anti-pinch flange 1527, to prevent the first handle 1511 and the second handle 1512 from further closing, so that if the first clamp jaw 1515 and the second clamp jaw 1516 suddenly slide off from a workpiece or suddenly become loose by accident or an object being held is accidentally damaged or detached, a user's hand gripping the first handle 1511 and the second handle 1512 is prevented from being injured.

In another embodiment of the present application, to provide the pin shaft 1531 with cushioning during clamping without causing the shaking of the clamp, the anti-pinch flange 1527 may be made of an elastic material such as rubber, silicone or plastic.

In conclusion, in the clamp described above, a protruding stop mechanism is disposed on the first clamp body and/or the second clamp body. The protruding stop mechanism can touch and be clamped on the opposite clamp body during narrowing or closing of the jaw opening, to prevent the first handle and the second handle from further closing, so that if the first clamp jaw and the second clamp jaw suddenly slide off from a workpiece or suddenly become loose by accident or an object being held is accidentally damaged or detached, a user's hand gripping the first handle and the second handle is prevented from being injured.

The specific preferred embodiments of the present application are described in detail as above. It should be appreciated that a person of ordinary skill in the art would be able to make modifications and variations in accordance with the concept of the present application without involving any inventive effort. Therefore, any technical solution that can be obtained by a person skilled in the art by means of logical analysis, reasoning or limited trials on the basis of the prior art and according to the concept of the present application should be comprised within the scope of protection of the claims.

The invention claimed is:

1. A clamp, comprising a first clamp body and a second clamp body, wherein the first clamp body and the second clamp body intersect and are fastened by means of a pivot mechanism, the first clamp body and the second clamp body form a jaw opening at one end of the pivot mechanism and form respective handles at the other end of the pivot mechanism, and the first clamp body and the second clamp body rotate with respect to each other around the pivot mechanism to implement holding of the jaw opening, wherein the first clamp body is provided with a protruding stop mechanism to enable the handle of the first clamp body and the handle of the second clamp body to be stopped by the stop mechanism when the handles are closed, so that a gap exists between the handle of the first clamp body and the handle of the second clamp body; and an anti-pinch flange is disposed at a position, corresponding to the protruding stop mechanism, on the second clamp body, to touch and be clamped on the protruding stop mechanism during narrowing or closing of the jaw opening; wherein the anti-pinch flange is a protruding barrier formed by protruding from one side of the second clamp body towards the first clamp body;

wherein the protruding stop mechanism is a protruding column body, the protruding stop mechanism and the anti-pinch flange are both made of an elastic material.

2. The clamp according to claim 1, wherein the protruding stop mechanism is located at a position, facing the second clamp body, between the jaw opening and an outermost end of the handle of the first clamp body, on the first clamp body, and the protruding stop mechanism touches and is clamped on the second clamp body at an opposite end during narrowing or closing of the jaw opening, to prevent the two handles of the first clamp body and the second clamp body from further closing.

3. The clamp according to claim 2, wherein the first clamp body comprises a first handle, a first clamp jaw, and a first shank portion connecting the first handle and the first clamp jaw; and the second clamp body comprises a second handle, a second clamp jaw, and a second shank portion connecting the second handle and the second clamp jaw; and wherein the first clamp jaw and the second clamp jaw form the jaw opening.

4. The clamp according to claim 3, wherein the first protruding stop mechanism is located on a side surface of the first shank portion of the first clamp body and faces the second clamp body.

* * * * *